(12) United States Patent
Phillips et al.

(10) Patent No.: US 8,085,528 B2
(45) Date of Patent: Dec. 27, 2011

(54) APPARATUS AND METHOD FOR AN ELECTRICAL SYSTEM ENCLOSURE

(75) Inventors: James Quentin Phillips, Mebane, NC (US); Dwaraka Nadha Reddy Manchuri, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 869 days.

(21) Appl. No.: 12/120,125

(22) Filed: May 13, 2008

(65) Prior Publication Data
US 2009/0284945 A1 Nov. 19, 2009

(51) Int. Cl.
*H02B 11/24* (2006.01)
(52) U.S. Cl. ............................ 361/617; 361/616; 174/67
(58) Field of Classification Search .................. 361/611, 361/614–617, 827, 809; 174/66, 67
See application file for complete search history.

(56) References Cited

U.S. PATENT DOCUMENTS

| 4,688,144 A * | 8/1987 | Kleinecke et al. ............ 361/617 |
| 4,768,967 A * | 9/1988 | Fritsch .......................... 439/152 |
| 5,486,978 A * | 1/1996 | Fishovitz ...................... 361/617 |
| 5,505,630 A * | 4/1996 | Petrisko et al. ............... 439/137 |
| 6,414,839 B1 * | 7/2002 | Derksen ........................ 361/617 |
| 7,561,412 B2 * | 7/2009 | Brandt et al. ................. 361/616 |
| 7,790,983 B2 * | 9/2010 | Gong et al. ..................... 174/67 |

* cited by examiner

*Primary Examiner* — Dameon Levi
(74) *Attorney, Agent, or Firm* — Global Patent Operation; Stephen G. Midgley

(57) ABSTRACT

The present disclosure describes an apparatus for enclosing electrical equipment. A shutter panel with at least one shutter aperture, at least one guide piece configured to align the shutter panel with a stab-on bore of a unit area, an operator member and a mounting member interconnected with a bus bar assembly is presented. A method for accessing electrical equipment in a motor control unit is also presented.

18 Claims, 5 Drawing Sheets

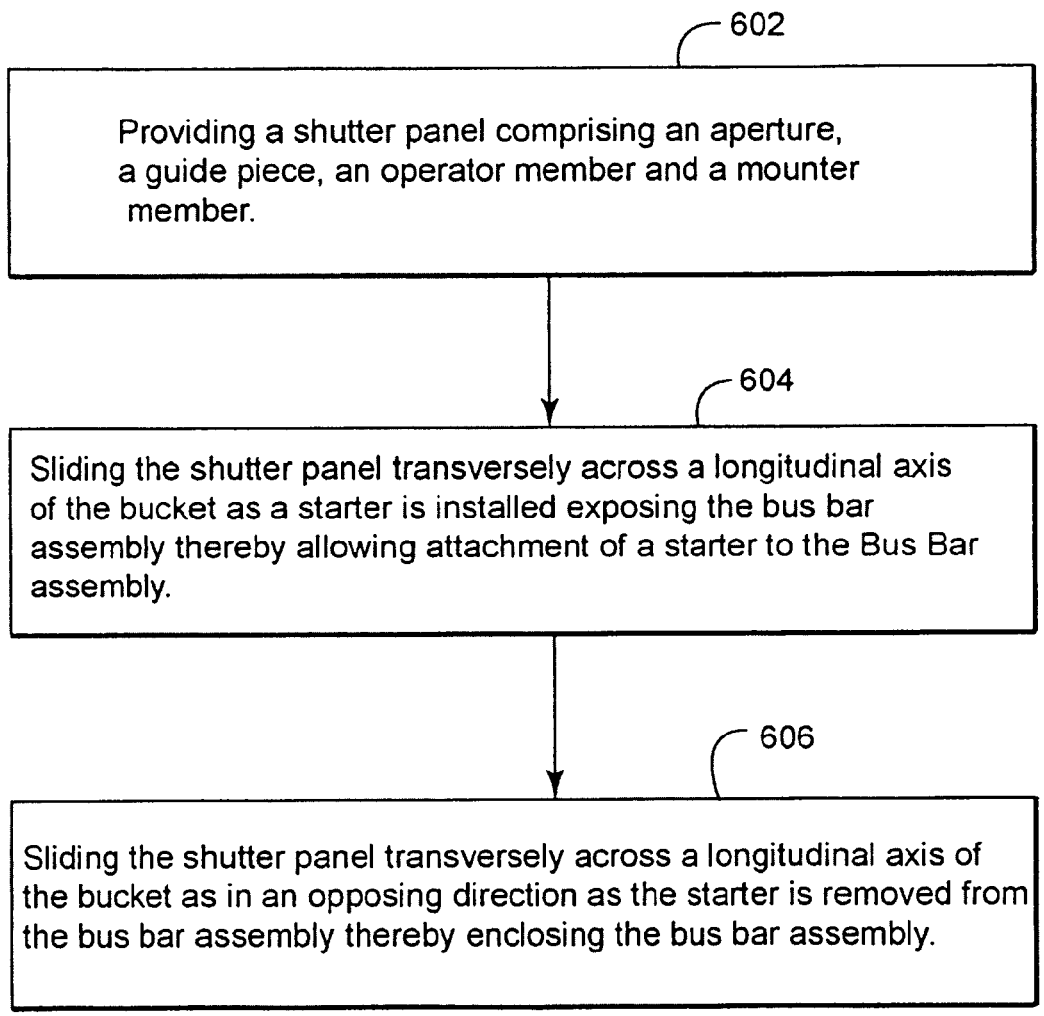

APPARATUS AND METHOD FOR AN ELECTRICAL SYSTEM ENCLOSURE

BACKGROUND OF THE INVENTION

The present invention relates to an apparatus and method for electrical system enclosures. More specifically, the invention relates to an apparatus and method for safely accessing electrical systems.

According to government statistics, one worker gets electrocuted in the workplace each day, and at least five more are admitted to the hospital with electrocution-type burns. As a result, it has become exceedingly important that manufacturers of potentially dangerous electrical equipment, such as bus bar assemblies, design their equipment in such a way that minimizes accidental electric shock to industrial workers.

Many prior approaches protecting against electrical contact have been utilized. Very early approaches include leaving bus bars open and posting signs and tags warning workers of electric shock. These methods have proved highly insufficient and do not protect against accidental contact.

Later, a device known as a manual shutter was provided. The shutter typically included a shutter panel having holes matching those of the mounting panel when the shutter was placed in an open position, so that an electrical device may be installed through the shutter and panel into contact with the bus bars. The shutters typically included one or more web areas between the holes, which cover the electrical connector openings in the panel when the shutter is in the closed position. However, bus bars were exposed before the shutter is manually closed, and during any time period when the shutter has been manually opened.

More recently, there have been different approaches utilizing an automatic shutter mechanism that closes on its own as an electrical device in contact with the bus bars is removed from the enclosure, without any action being taken by a technician or operator. These approaches have included, for example, a shutter operating under the force of gravity via an inclined plane, and shutters using a shutter actuation system, which often include complex arrangements of cams, levers, chains and sprockets. These prior automatic shutter actuation systems have tended to be bulky and complex. Furthermore, these designs must be installed as the assembly is being put together.

Accordingly, to date, there is additional need for a more simple apparatus or method for enclosing electrical equipment.

BRIEF DESCRIPTION

The present disclosure describes an apparatus and method for an electrical system enclosure comprising a shutter panel. The shutter panel may comprise at least one shutter aperture, at least one guide piece configured to align the shutter panel with a stab-on bore of a unit area, and an operator member. The operator member may be operably connected to a first side of the shutter panel and configured to slide the shutter panel to an open or closed position and a mounting member connected to the operating member, the mounting member being interconnected with a bus bar assembly.

In another embodiment of the present invention, the invention describes a method for accessing electrical equipment in a motor control unit comprising providing a shutter panel for mounting to a vertical bus assembly. The shutter panel may comprise at least one shutter aperture, at least one guide piece configured to align the shutter panel with a stab-on bore of a unit area, and an operator member operably connected to a second side of the shutter panel. The operator member may be configured to slide the shutter panel to an open or closed position. The shutter member may further comprise a mounting member connected to the operating member, which may be interconnected with a bus bar assembly. Thus, the method may further comprise sliding the shutter panel transversely across a longitudinal axis of the unit area as an electrical component is installed exposing the bus bar assembly thereby allowing attachment of a electrical component to the bus bar assembly and sliding the shutter panel transversely across a longitudinal axis of the unit area in an opposing direction across the unit area as the electrical component is removed from the bus bar thereby enclosing the bus bar assembly.

Other features and advantages of the disclosure will become apparent by reference to the following description taken in connection with the accompanying drawings.

BRIEF DESCRIPTION OF THE DRAWINGS

Reference is now made briefly to the accompanying drawings, in which:

FIG. 6 is a flow chart is describing a stepwise method in accordance with a further embodiment of the present invention.

Like reference characters designate identical or corresponding components and units throughout the several views, which are not to scale unless otherwise indicated.

DETAILED DESCRIPTION

One embodiment of the present invention involves a shutter assembly configured to enclose electrical equipment such as a vertical bus bar assembly comprising a shutter, a guide piece, an operator member and a mounting member. Two particular advantages afforded by this invention are simplification of manufacturing the shutter assembly and the ability to install the assembly after the bus bar assembly is installed.

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, while some embodiments of the invention are herein described with reference to a vertical bus bar, a skilled artisan will recognize that embodiments of the invention can be implemented in any setting in which enclosure of electrical equipment is advantageous. For example, some non-limiting examples may include enclosing a main bus, or enclosing live circuitry in a distribution board.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Figure 1:
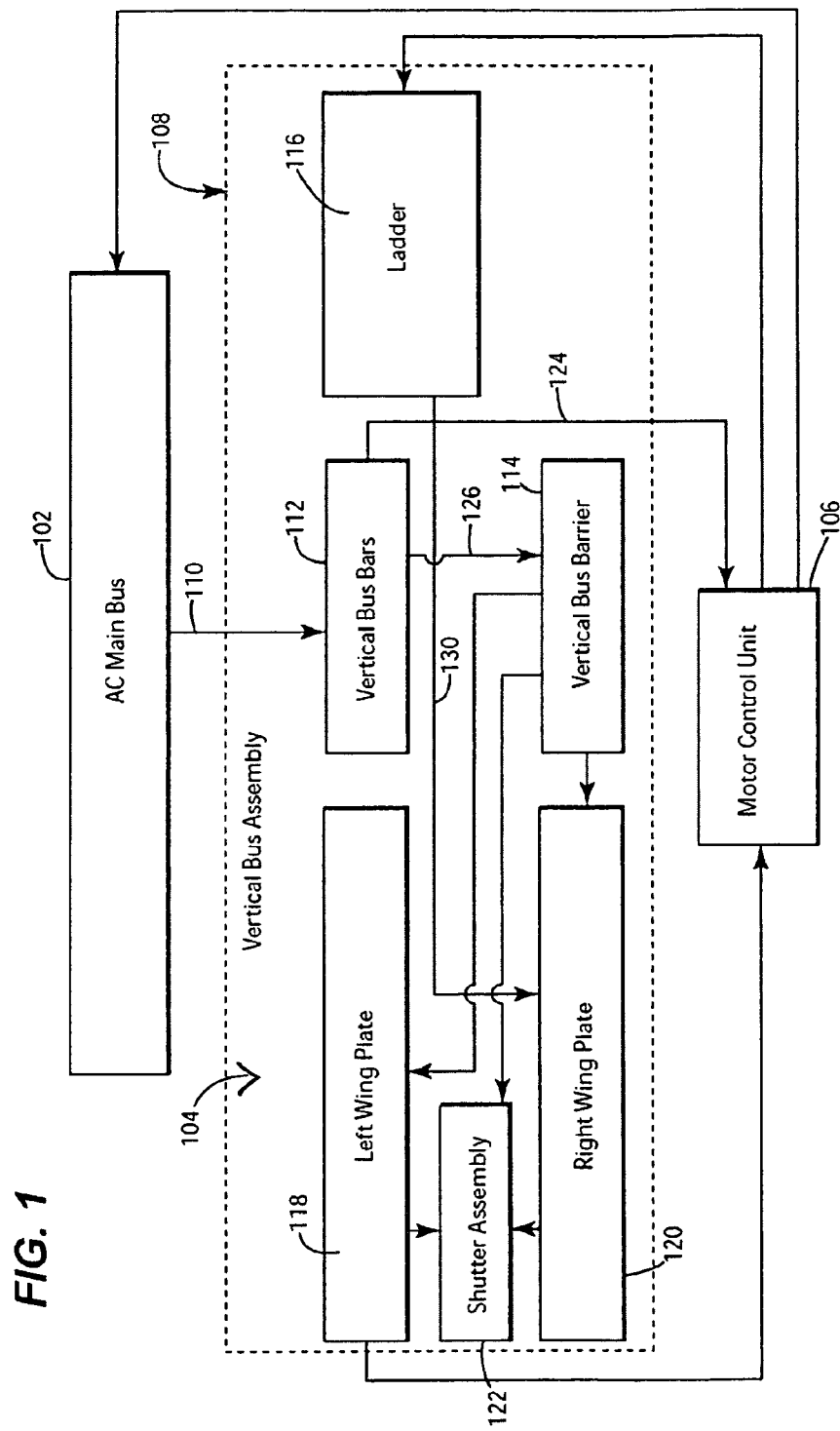
FIG. 1 is schematic block diagram of a motor control center to which embodiments of the present invention relate.

Referring now to FIG. 1, there is shown a functional block diagram of a motor control center to which embodiments of the present invention relate. The motor control center may comprise main bus 102, vertical bus assembly 104, motor control unit 106 and enclosure 108. In one exemplary embodiment, the present invention is a safety component attached to the vertical bus assembly 104.

A main bus may be configured to carry electrical power from the supply mains (not shown) to the vertical bus and to individual motor control units 106. Accordingly, the main bus 102 may be electrically connected via line 110 to the vertical bus 104.

The vertical bus assembly 104 may comprise vertical bus bars 112, vertical bus barriers 114, ladder 116, left and right wing plates 118 and 120 and shutter assembly 122. The vertical bus assembly may be configured to distribute power to individual motor control units 106 via line 124. The vertical bus barrier 114 may be further mounted to each of left and right wing plates 118 and 120. The shutter assembly 122 may be mounted to the left or right wing plates 118 and 120 of a bus bar as well, and the wing plates may be configured to provide support to the vertical bus barrier.

When the motor control unit is installed, the ladder 116 may provide mounting for the shelf (not shown) that supports the motor control unit, thereby transferring weight to the ladder 116. For example, the ladder may be connected to the right wing plate 120 via line 130 to provide weight transfer. In this exemplary embodiment of the present invention, the ladder may be further configured to support and locate shelves (not shown), serve as a latch point for doors of an enclosure, and provide wireway conduits wherein an operator may bring incoming and outgoing motor and control cables or wires to and from each of the motor control units 106.

The shutter assembly 122, which will be discussed in greater detail with reference to FIGS. 2-6, is generally configured to enclose stab-on bores, fingers, contacts and the like to which the vertical bus is adjacent. In practice, operators place starters into the stab-on bores to connect to the vertical bus. Therefore, the shutter assembly may be configured to slide axially or transversely across a unit area to reveal the stab-on bores allowing access to the vertical bus.

Figure 2:
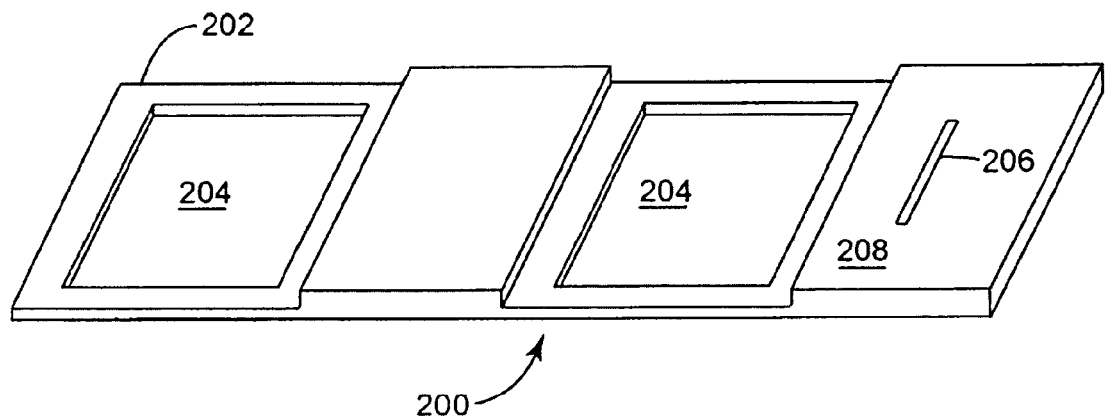
FIG. 2 is a diagram showing a shutter plate to which embodiment of the present invention relate.

Referring now to FIG. 2, an exemplary diagram of shutter panel applicable in an embodiment of the present invention is shown generally at 200. The shutter panel may comprise at least one aperture 204, shutter 208 and formed channel 206.

The shutter panel 202 and shutter guide pieces (not shown) may be comprised of any nonconductive material, e.g., any composite that does not conduct electrical current and is capable of withstanding inherent heat given off by a vertical bus assembly. The shutter panel may comprise apertures 204 that may be configured, in conditions to be discussed with reference to FIGS. 4 and 5, to expose the underlying vertical bus assembly for insertion of electrical elements (e.g., starters and stabs) by an operator.

In another embodiment of the present invention, it may be advantageous for the shutter panel 202 to comprise shutter 208 at one or both ends of the shutter panel 202. If the shutter panel 200 is in an open position, the left wing plate may act as a stop mechanism against the shutter assembly. However, in a closed position, the operator member may act as a stop mechanism against the vertical bus barrier. For example, as the shutter panel is moved transversely across the longitudinal axis of a unit area assembly (not shown) the shutter may come to rest against the left wing plate thereby impinging any further movement across the unit area assembly.

With further reference to FIG. 2, the shutter panel may further comprise a mounting member 206. The mounting member 206 may be dimensioned for attachment of an operator member (not shown) to the shutter panel 202 at a first end. For example, the mounting member 206 may comprise a formed channel that may correspond with a first end of a flat spring and be configured to receive a first end of the flat spring, which will discussed with reference to FIG. 3. In optional embodiments of the present invention, any mode of mounting an operator member to the shutter panel may be sufficient (e.g., the mounting member may be fixed by rivets, screws, adhesives, and the like). Furthermore, it is to be appreciated that while in the present exemplary embodiment in FIG. 2 the mounting member is on a first end of the shutter panel, an operator member may be affixed at any advantageous location to accomplish the present objectives.

Figure 3:
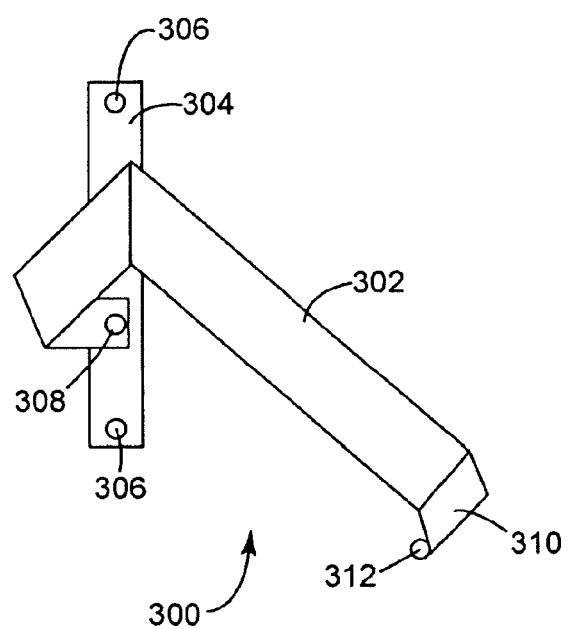
FIG. 3 is an enlarged view of the operator member and mounting member to which embodiments of the present invention relate.

With reference now to FIG. 3, there is shown an exemplary operator member and mounting member at 300. In this exemplary embodiment, the operator member comprises a flat spring 302. The first end of the flat spring 310 may comprise an ellipsoidal end 312 that corresponds to and may be dimensioned to fit within the mounting member discussed with reference to FIG. 2. Flat springs, as is known in the art, are configured to keep force within a restricted space condition (i.e., a unit area assembly comprising raised wing plates). The flat spring may be designed to exert a torque or force in a direction that pushes the shutter panel transversely across the unit area assembly as an electrical component is being inserted. The act of insertion may be, for example, a force greater than that of the force exerted by the flat spring in an opposing direction thus pushing the flat spring in a transversely opposite direction across the unit area assembly. Conversely, the act of removal of an electrical component may eliminate that opposing force, thereby allowing the flat springs force to push the shutter panel back across the unit area assembly again, and consequently covering the electrical stab bores.

The flat spring 310 may be manufactured, for example, from high-carbon spring steel, phosphor-bronze, beryllium-copper, nickel-silver, high-nickel specialty alloys and the like. The flat spring may be further designed to deflect approximately 25 percent or less of the flat springs overall length. A suitable flat spring usable in the present invention is manufactured by Katy Spring & Mfg. Inc. and may be found on the World Wide Web at http://www.katyspring.com. In optional embodiments of the present invention, the operator member may comprise torsion springs, leaf springs, cantilevers, and the like.

With further reference to FIG. 3, the mounting member 304 may comprise mounting bores 306 and may be attached to the operator member at 308. The mounting bores may be configured for attachment of the mounting member 306 to a wing plate (not shown), enclosure (not shown), or bus assembly (not shown) via rivets, screws or the like. The attachment to the operator member at 308 may also comprise the use of rivets, screws and the like.

Figure 4:
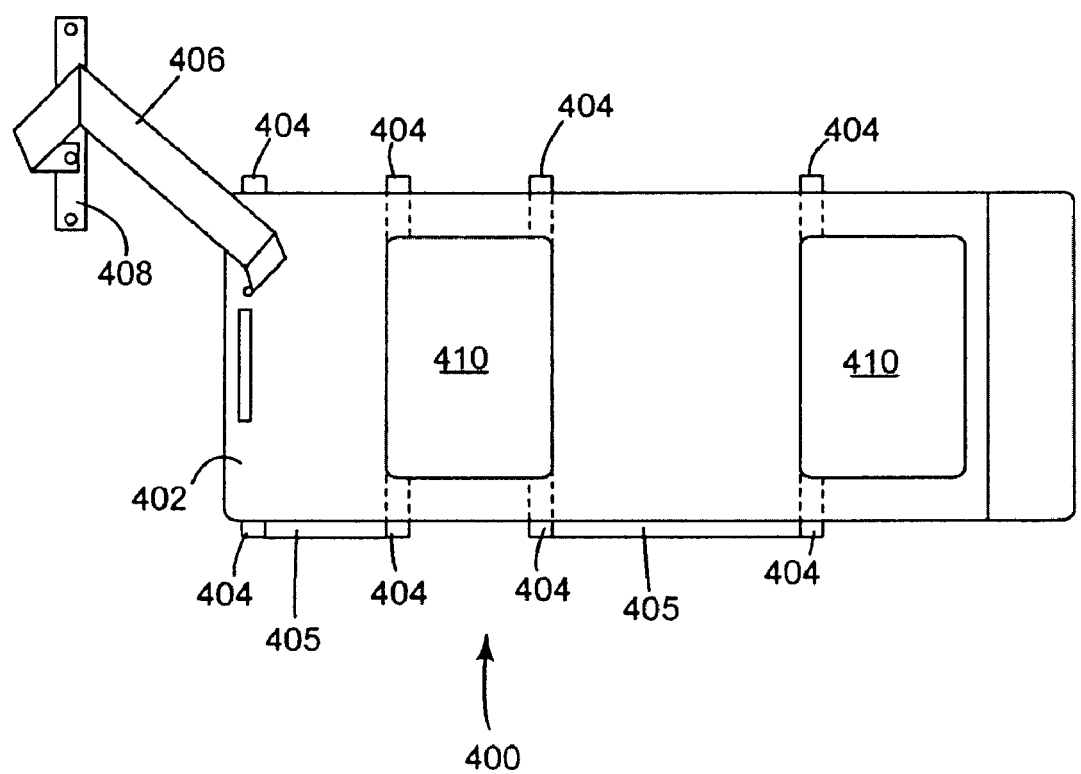
FIG. 4 is a diagram showing an exemplary shutter plate and operator member to which embodiments of the present invention relate.

Referring now to FIG. 4, an apparatus for enclosing electrical equipment is shown generally at 400. The apparatus may comprise a shutter panel 402 having apertures 410, guide pieces 405, an operator member 406 and a mounting member 408. This exemplary assembly, as shown, may facilitate safe interaction and communication between a vertical bus bar assembly and a starter assembly having stabs that sizably correspond to stab-on bores of the vertical bus bar assembly, which will be discussed with reference to FIG. 5.

Guide pieces 405 may be configured to align the shutter panel 402 with the stab-on bores the unit area assembly. The guides 405 may comprise retaining ears 404. The retaining ears 404 may be configured to guide the shutter between the open and closed positions. The guides may also comprise retaining members (not shown) that sizably correspond to predetermined apertures in the vertical bus assembly. In turn, the retaining members may snap into the apertures of the vertical bus barrier and be the supporting structure for the shutter assembly.

Figure 5:
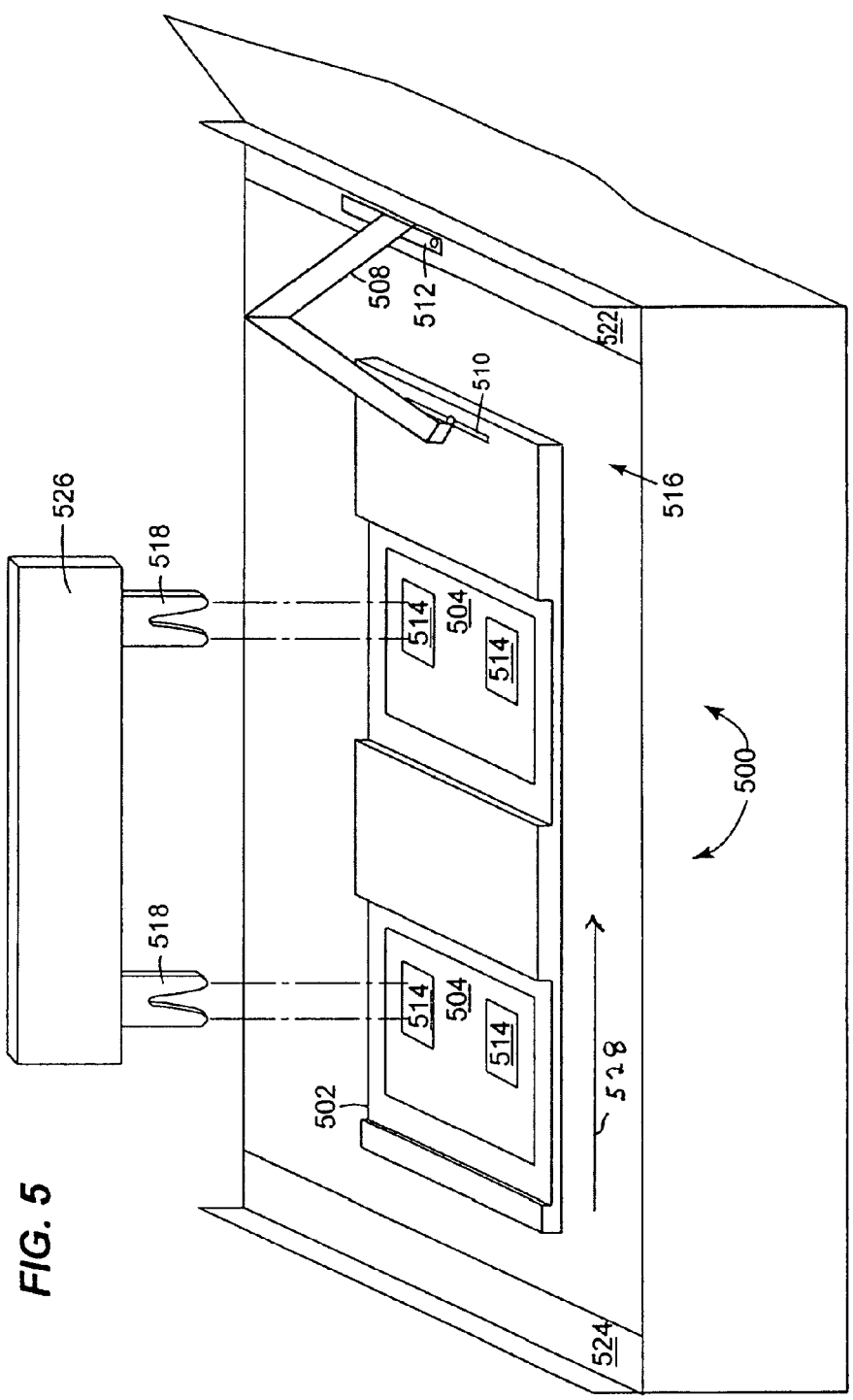
FIG. 5 is a diagram showing a shutter assembly mounted to a unit area.

Now with reference to FIG. 5, a portion of a vertical bus assembly and a shutter assembly is shown generally at 500. The portion of the vertical bus assembly comprises unit area 516, a plurality of stab-on bores 514, wing plates 522 and 524 and stabs 518. The shutter assembly comprises shutter panel 502, apertures 504, operator member 508, comprising a flat spring, and mounting member 512.

As shown, the shutter panel 502 is in an open position. By "open position" it is meant that shutter apertures 504 are in a position to allow the stabs 518 to be inserted into the stab-on bores 514 of the unit area 516. The stabs 518 may comprise any electrical apparatus to be inserted into a unit area, and may be inserted via device installer 526, or may be inserted manually via an operator. In kind, it is to be appreciated that the shutter apertures may come to be in an open position, via movement by an operator or some mechanical connection to the device installer 526 as the stabs are being inserted into the stab-on bores. For example, as the stabs 518 move into the stab-on bores 514, a force is exerted on operator member 508, in the direction of arrow 528, which is greater than the force exerted by the operator member 508 in the opposite direction to arrow 528 thereby moving the shutter transversely across the axis if the unit area and exposing the stab-on bores for insertion of the stabs.

Conversely, by "closed position" it is meant that the shutter apertures 504 are in a position to cover the stab-on bores 514 of the unit area 516. The shutter may come to be in this position because as removal of the stabs occurs, this alleviates the force holding the operator member from sliding the shutter transversely across the unit area assembly, in the opposite direction to arrow 528, thereby covering access to the stab-on bores. Therefore, the operator member may bias the shutter panel to the closed position. The operator member may then come into contact with the bus barrier to stop shutter panels movement across the unit area. Therefore, it can be seen that the closed position may be the default position of the assembly to help insure that workers are do not accidentally come into contact with those dangerous components of the bus bar.

With further reference to FIG. 5, the mounting member 512 of the operator 508 may be attached to the wing plate 522 of the bus bar assembly for stabilization purposes and to transfer the force from the insertion of the stab-on bores. In an optional embodiment, the mounting member 512 may be mounted to the enclosure (see FIG. 1, reference number 108).

Referring now to FIG. 6, a method for enclosing electrical equipment in a motor control unit is provided. The flowchart is shown to better help illustrate this exemplary method. While the flowchart shows an exemplary step-by-step method, it is to be appreciated that a skilled artisan may rearrange or reorder the steps while maintaining like results.

In one embodiment of the present invention the method comprises providing a shutter panel 602. The shutter panel may comprising at least one aperture, at least one guide piece mounted to a first side of the shutter panel, an operator member operably connected to a second side of the shutter panel configured to slide the shutter panel to an open or closed position, a mounting member connected to the operating member, the mounting member comprising at least one bore for attaching to a bus bar assembly.

Sliding the shutter transversely across a longitudinal axis of the unit area as an electrical component is installed exposing the bus bar assembly thereby allowing attachment of the electrical component to the bus bar assembly 604 may comprises utilization of the force of the electrical component being greater than the force of the operating member in the opposing direction.

Sliding the shutter panel transversely across a longitudinal axis of the unit area in an opposing direction as the electrical component is removed from the bus bar thereby enclosing the bus bar assembly 606 may utilize removal of force that held the operator member in place.

Although specific features of various embodiments of the invention may be shown in some drawings and not in others, this is for convenience only. In accordance with the principles of the invention, the feature(s) of one drawing may be combined with any or all of the features in any of the other drawings. The words "including", "comprising", "having", and "with" as used herein are to be interpreted broadly and comprehensively and are not limited to any physical interconnection. Moreover, any embodiments disclosed herein are not to be interpreted as the only possible embodiments. Rather, modifications and other embodiments are intended to be included within the scope of the appended claims.

What is claimed is:

1. An apparatus for enclosing electrical equipment comprising:
    a shutter panel comprising at least one shutter aperture;
    at least one guide piece configured to align the shutter panel with a stab-on bore of a unit;
    an operator member operably connected to a first side of the shutter panel, wherein the operator member is operably configured to bias the shutter panel in a closed position in response to a force applied directly by an electrical element on the shutter panel; and
    a mounting member connected to the operating member, the mounting member being interconnected with a bus bar assembly.

2. The apparatus of claim 1, wherein the at least one aperture is configured to provide access to the stab-on bore when the shutter panel is in an open position.

3. The apparatus of claim 1, wherein the shutter panel is configured to prevent access to the stab-on bore when the shutter panel is in a closed position.

4. The apparatus of claim 1, wherein the guide piece further comprises retaining members configured for entry into pre-existing apertures of the bus bar assembly.

5. The apparatus of claim 1, wherein the operator member comprises a slide piece and the shutter panel further comprises a correspondingly formed channel configure to receive the slide piece.

6. The apparatus of claim 1, wherein the operator member comprises a flat spring, a torsion spring, a leaf spring or a cantilever.

7. The apparatus of claim 1, wherein the shutter panel is configured to slide transversely along the unit thereby exposing the bus bar assembly to allow connection of the electrical component to the bus bar assembly.

8. The apparatus of claim 7, wherein the shutter panel is further configured to slide transversely along the unit in an opposing direction thereby enclosing the bus bar assembly.

9. The apparatus of claim 1, wherein the stab-on bores are dimensioned to receive stabs of the electrical component.

10. The apparatus of claim 1, wherein the the shutter panel is configured to come to rest against a vertical bus barrier in the closed position.

11. A method For accessing electrical equipment in a motor control unit comprising:
    providing a shutter panel for mounting to a vertical bus assembly comprising:
        at least one shutter aperture;
        at least one guide piece configured to align the shutter panel with a stab-on bore of a unit;
        an operator member operably connected to a second side of the shutter panel and configured to urge the shutter panel to a closed position;
        a mounting member connected to the operating member, the mounting member being interconnected with a bus bar assembly,
    applying a force directly to the shutter panel with an electrical component to slide the shutter panel transversely along the unit to an open position as the electrical component is installed thereby allowing attachment of the stab to the bus bar assembly.

12. The method of claim 11, wherein the at least one aperture is configured to provide access to the stab-on bore when the shutter panel is in the open position.

13. The method of claim 11, wherein the shutter panel is configured to block access to the stab-on bore when the shutter panel is in a closed position.

14. The method of claim 11, wherein the guide piece further comprises retaining members configured for entry into pre-existing apertures of the bus bar assembly.

15. The method of claim 11, wherein the operator member comprises a slide piece and the shutter panel further comprises a correspondingly formed channel configured to receive the slide piece.

16. The method of claim 11, wherein the operator member comprises a flat spring, a torsion spring, leaf spring or cantilever.

17. The method of claim 11, wherein the stab-on bores are dimensioned to receive the stabs of the electrical component.

18. The method of claim 11, further comprising removing the electrical component, and during the removal, biasing the shutter panel to a closed position thereby enclosing the bus bar assembly.

\* \* \* \* \*